INVENTORS.
ADOLPH J. HILGERT
JAMES R. BAILEY
BY
Andrus & Starke
ATTORNEYS

Nov. 19, 1968    A. J. HILGERT ET AL    3,411,704
PNEUMATIC CONTROLLER
Filed Sept. 26, 1966                               2 Sheets-Sheet 2

INVENTORS.
ADOLPH J. HILGERT
JAMES R. BAILEY
BY
Andrus & Starke
ATTORNEYS

United States Patent Office 3,411,704
Patented Nov. 19, 1968

3,411,704
PNEUMATIC CONTROLLER
Adolph J. Hilgert, Mequon, and James R. Bailey, Milwaukee, Wis., assignors to Johnson Service Company, Milwaukee, Wis., a corporation of Wisconsin
Filed Sept. 26, 1966, Ser. No. 581,815
15 Claims. (Cl. 230—20)

ABSTRACT OF THE DISCLOSURE

An electromagnetically driven air compressor includes four pulsed driving coils on four equicircumferentially spaced cores to reciprocate an armature and diaphragm pump.

A signal coil is wound on one core to provide a continuously variable signal.

A leak port servo valve controls the exhaust of the compressor and the load operator. The terminal end of the valve nozzle is a resistance, the value of which is determined by the pressure engagement of the valve lid.

The compressor is controlled by the resistance and the signal from the signal coil.

---

This invention relates to a pneumatic controller and particularly to a pneumatic controller employing an electrically responsive servo valve to control the interconnection of a pneumatic source to a pneumatic operator.

In control systems employing a substantial number of controlled devices, an electro-pneumatic control system employing pneumatically actuated operators such as the piston or diaphragm type has many advantages particularly from the standpoint of simplicity and expense when compared to mechanical systems. The pneumatic control system requires an air source, generally an air compressor, which may be relatively expensive. Where only a few load devices are involved, the cost may be such as to result in an overall cost in excess of the electrical to mechanical type of control system. Further, conventional compressors are generally relatively bulky and present a source of noise.

Therefore, in the field of pneumatic control systems, a small, compact and highly efficient electro-pneumatic compressor of a relatively low cost is needed, particularly for operating of one or a few pneumatic load operators.

The present invention is particularly directed to the provision of a novel electro-pneumatic compressor in combination with a novel electro-pneumatic servo valve which is adapted to control the transmission of air from the compressor to the load operator and to control the compressor operation and thereby provide control. A solid state compressor driver circuit is interconnected to signal means from the compressor and from the servo valve to maintain full stroke operation of the compressor in accordance with load requirements.

Generally, the present invention provides an electromagnetically driven air compressor having one or more driving coils associated with a magnetic unit having a movable armature connected to a compressor drive member. The armature and attached compressor drive members are resiliently biased to a given position and energization of the coils causes the armature to move to a second position. The driving coils are pulsed to provide oscillatory movement of the drive member of the compressor. The movement of the drive member alternately establishes a pressure and a suction force within a chamber having suitable inlet and outlet valves to permit entrance of air during the suction stroke and discharge of air during the pressure stroke.

The driving coils are energized in accordance with the present invention in response to positioning of a servo valve and a signal coil wound on the magnetic assembly to establish and maintain intermittent and full stroke operation of the compressor under load conditions.

The servo valve in accordance with the present invention is preferably of a leak port variety connected to control the exhaust of the compressor and thereby control the pressure established in the load operator. The servo valve further includes an input signal means adapted to control the spacing of a leak port lid with respect to the exhaust nozzle. A variable resistance is set by the positioning of the lid and is interconnected into the energizing control circuit for the electromagnetic compressor. A unique variable resistance is provided by having the lid and the terminal end of the nozzle form resistance contacts, the resistance being determined by the spacing and pressure engagement of the lid on the nozzle.

The compressor cycle or energizing control circuit preferably includes a negative gain direct current amplifier having the driving coils or windings connected in the output circuit in series with an electronic switching means such as a transistor. The signal coil wound on the magnetic assembly of the electromagnetic pump is connected to bias a cutoff transistor or element in the driving control circuit such that it provides a cutoff of the energization of the driving coils in accordance with the movement of the armature. In accordance with the present invention, the point of cutoff with respect to the armature position during its strokes will vary directly with the loading of the compressor; i.e. the output pressure against which it is operating which in turn is established by the servo valve. The acceleration of the armature is directly related to the output pressure and consequently the rate of rise of the signal voltage is directly related to the output pressure. At low loads, the armature can rapidly accelerate and consequently provide a more rapidly rising and higher signal than that provided as the output load increases. As a result, the cutoff voltage generated in the signal coil and applied to the control circuit occurs sooner in the armature travel for low pressures or light loads than for high loads and associated high pressures.

Additionally, the variable contact resistance provided by the leak port or gap construction is interconnected to provide an overriding cutoff control to the amplifier. Thus, the system is established such that with the leak port in one maximum position, the corresponding resistance is such as to prevent conduction whereas in the opposite position it permits conduction. The leak port system will normally be set up to start the system as a signal to the servo valve is increased and the contact resistance is varied until at a selected point the circuit to the driving coils is permitted to establish conduction through the coils. The operation of the compressor causes increased output loading or variation in the output loading which in turn varies the spacing of the leak port lid and consequently varies the contact resistance in an opposite direction. When the contact position reaches a selected level, energization of the compressor is terminated until the load increases to a level to open the leak port and the pump until such time as a balance condition is obtained. Reducing of the signal to the servo valve varies the setting of the contacts in an opposite direction to reverse the action and maintain the lower pressure output.

The present invention is thus directed to an improved electro-pneumatic control system and particularly a compact and relatively inexpensive unit which can be operated at high efficiency and as a relatively noiseless unit.

The drawings furnished herewith illustrate a preferred construction of the present invention in which the above advantages and features are clearly disclosed as well as others which will be clear to those skilled in the art from the following description.

Figure 1:
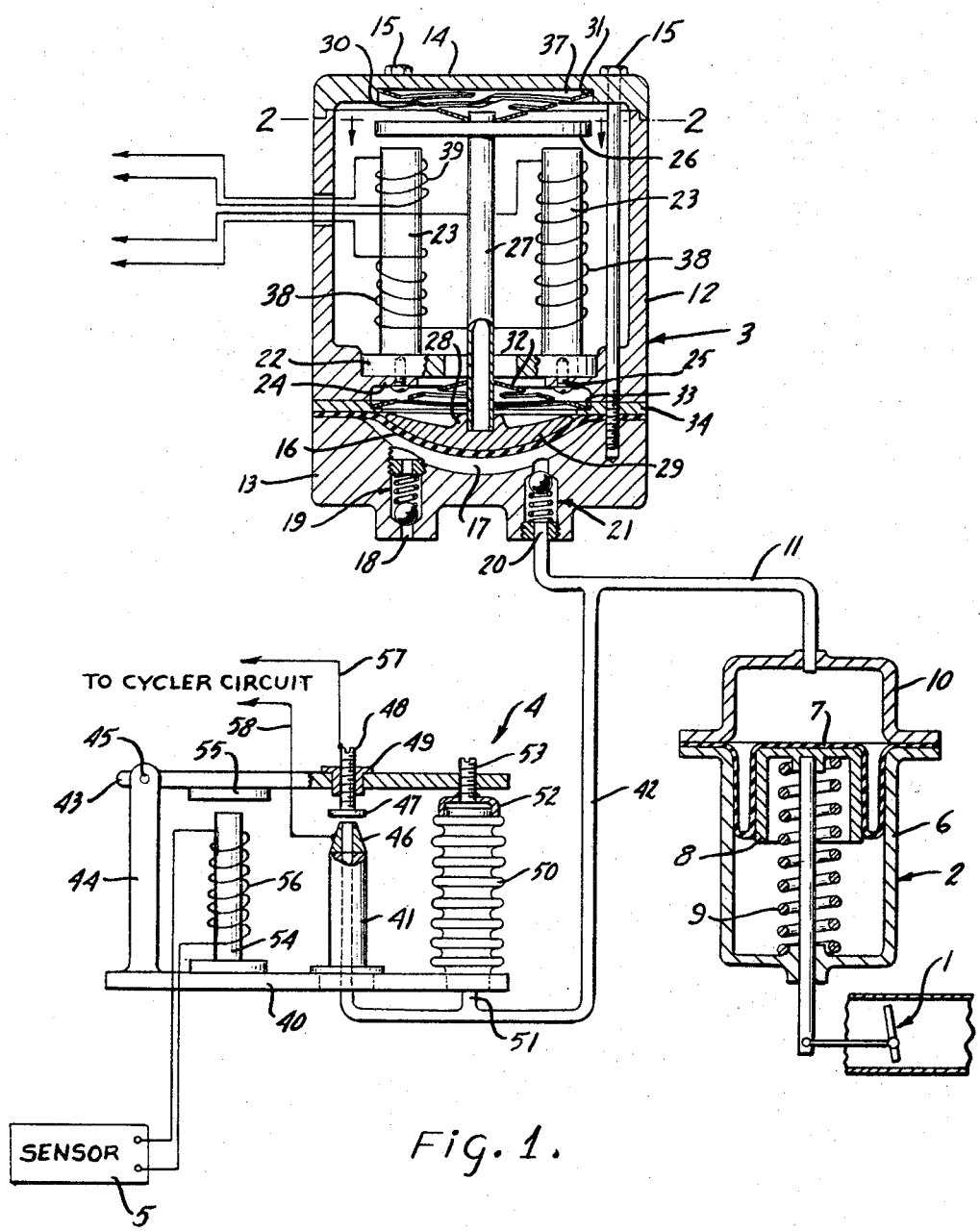
FIG. 1 is a diagrammatic view of an electro-pneumatic operator control system constructed in accordance with the present invention.

Referring to the drawings and particularly to FIG. 1, the invention is shown in an electro-pneumatic control system for operating an air damper 1 through a piston-type pneumatic operator 2. The air for actuating the operator 2 is from a novel electromagnetic compressor 3 constructed in accordance with the present invention and controlled through a novel servo valve unit 4. A condition sensor 5 provides an input signal to the servo valve unit 4 for establishing the pressure level and positioning of the operator 2 in accordance with sensed conditions such as temperature. The servo valve unit 4 serves the dual function of controlling the operative connection between the compressor 3 and the operator 2 and further providing an overriding control of the operation of the compressor 3.

The illustrated pneumatic operator 2 is any well known device and includes a cup-shaped cylinder 6 having a flexible bag diaphragm 7 secured to the one end. A piston 8 is centrally secured to the diaphragm 7 and includes a shaft projecting outwardly of the cylinder 6 through a suitable bearing in the closed end of the cylinder and interconnected to the air damper 1. A spring 9 acting between the cylinder 6 and the piston 8 urges the piston 8 inwardly into the cylinder and toward an outer cup-shaped head 10. An air line 11 interconnects the cup-shaped head to the output of the compressor 3 for pneumatically positioning the diaphragm 7 and attached piston 8 against the bias of the spring 9.

The compressor 3 which particularly forms a part of the subject matter of the present invention is shown in preferred construction and includes a tubular housing 12 closed at one end by a pumping chamber head 13 and at the opposite end by an end cap 14 by a plurality of through bolts 15 which extend through the cap 14 and housing 12 and thread into appropriately tapped holes in head 13. A diaphragm 16 is clamped between the head 13 and the housing 12 to define a pump chamber 17. The head 13 includes an air inlet passageway 18 within which a suitable spring loaded check valve 19 is secured and an air discharge passageway 20 similarly closed by an oppositely directed spring loaded check valve 21. Check valves 19 and 21 are conventional spring loaded ball check units and no further description thereof is specifically given.

Generally, during the retraction of the diaphragm 16 it opens the check valve 19 and seals check valve 21 to draw air into the chamber 17. During the working stroke, the diaphragm 16 moves in the opposite direction and seals the inlet check valve 19 and opens the check valve 21 to discharge air through the discharge passageway 20 and air line 11 to the penumatic operator 2.

Figure 2:
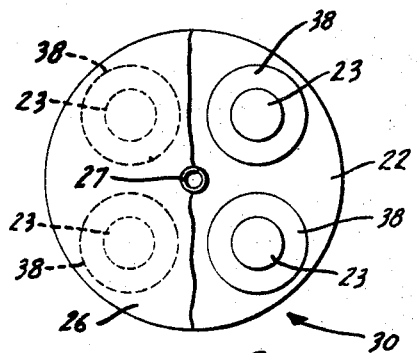
FIG. 2 is a top elevational view of the electro-pneumatic pump shown in FIG. 1 with parts broken away to show the details of construction.

The compressor 3 is actuated by an electromagnetic means including a magnetic core assembly having a ring-shaped base 22 from which four equicircumferentially distributed cores 23 extend axially of the housing 12, as most clearly shown in FIGS. 1 and 2. The base 22 is secured to an annular supporting ledge 24 integrally formed on the inner end of the housing 12 immediately adjacent the pump head 13. The base 22 is shown secured to the ledge 24 by small attachment screws 25.

A disc-shaped armature 26 is mounted overlying the outer ends of the cores 23. The armature 26 is shown as a solid magnetic member having a central opening within which a bearing tube 27 is secured as by a force fit or the like. The bearing tube 27 extends downwardly coaxially of the distributed cores 23 and through aligned openings in the base 22 and the ledge 24. The inner end of the bearing tube 27 is press fitted or otherwise secured within a hub 28 on the back side of a diaphragm backup plate 29. A first lateral guide spring 30 is disposed between the outer end of the bearing tube 27 which projects outwardly slightly beyond the armature 26 and an abutment 31 in the cap 14 to laterally guide the upper end of the tube. A similar spring 32 is disposed between a portion of the tube 27 below the ledge 24 and an abutment 33 formed in the connection of the pump head 13 to the housing 12 by a sealing washer 34 disposed between the head 13 and housing 12 to load the tube 27 and laterally guide tube 27 at the lower and upper ends.

Figure 3:
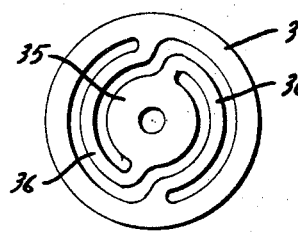
FIG. 3 is a top elevational view of a bias spring shown in FIG. 1.

The springs 30 and 32 are similar and preferably formed as shown in FIG. 3. Generally the springs are formed of a leaf spring metal and include a central ring portion 35 which is centrally apertured to be press fitted or otherwise secured to the bearing tube 27. The portion 35 is interconnected by a pair of oppositely disposed serpentine annularly extending spring arms 36 to an outer ring 37 which engages the respective abutments 31 or 33. The springs 30 and 32 are assembled with the portions 35 axially displaced from the ring 37 in opposite directions to establish tension in arms 36 holding the plate 29 engaging the stop portion formed by extension of the sealing and clamping washer 34. In the standby position, the armature 26 is spaced from the ends of the cores 23. Springs 30 and 32 allow limited axial movement of the tube 27 and attached plate 29 while minimizing lateral movement. Four parallel connected driving coils 38 are provided and wound one each on each of the four cores 23. When the coils 38 are energized, a magnetic flux is generated in cores 23, base 22 and armature 26 which attracts the armature 26 to the ends of the cores and closes the gap established by the bias springs 30 and 32. The armature movement is transmitted via tube 27 to plate 29 and diaphragm 16 causing air to be compressed ahead of the diaphragm.

Under all modes of operation, electric power is so applied to the coils 38 to insure complete movement of the armature 26 between the closed and the open air gap position.

As more fully described in connection with the circuit of FIG. 4, the cutoff of the energization of the coils 38 is responsive to a signal generated in a signal coil 39 wound on at least one of the cores 23. The signal coil 39 is arranged such that it is linked by the flux produced by the driving coils 38 and a gradually rising voltage is generated in the signal coil. The rate of rise and the amplitude of the signal voltage is directly related to the acceleration or rate of movement of the armature 26 when the coils 38 are energized. The signal coil 39 is connected to conjointly control an energization circuit, shown in FIG. 4, with a control means of the servo valve unit 4. As more fully described hereinafter, the signal of coil 39 is operative to terminate the energizing cycle at a selected voltage level and therefore will terminate the cycle at different armature positions.

Figure 5:
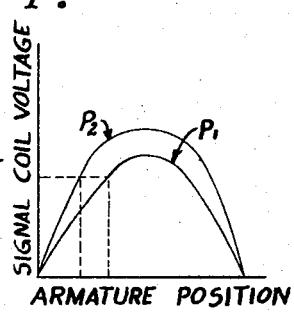
FIG. 5 is a graph showing the signal voltage generated in the electro-pneumatic compressor for two different loads.

Generally, the signal in coil 39 is a gradually rising signal such as shown in FIG. 5 wherein a pair of signal characteristics are shown for the position of the armature versus the voltage level in the signal coil. The signal characteristics are related to different load pressure $P_1$ and $P_2$ in the opeartor; $P_1$ being greater than $P_2$. The greater load pressure $P_1$ causes the armature 26 to accelerate at a lesser rate than that associated with $P_2$ and consequently the voltage signal rises more slowly. The voltage level at which energization circuit is opened remains the same and consequently this level is reached earlier in the armature travel for a light load than for a high load, as indicated by the intersection of the cutoff voltage line on the two curves. The armature 26 and the pump diaphragm 16 are moved closer to the end of the full stroke position for heavier loads than for lighter loads. This permits establishment of the system to always cut off energization before the armature 26 strikes the cores 23 and allows essentially all of the kinetic energy in the moving parts including armature 26 and diaphragm plate 29 to be absorbed in completing the working stroke. This is practically of substantial significance in order to minimize noise.

The servo valve unit 4 of the present invention is a pneumatic air control unit and includes a base 40 from which an exhaust control nozzle 41 projects. The nozzle 41 is connected via a line 42 to the air connecting line 11 to provide an air exhaust path. A transfer lever 43 is pivotally mounted at one end to an upstanding pedestal 44, and extends outwardly overlying the discharge or orifice end 46 of the nozzle 41. A nozzle lid 47 is adjustably secured to the transfer lever 43 in alignment with the nozzle. The lid 47 is shown mounted by a threaded attachment screw 48 threaded through a suitably tapped electrically insulating bushing 49 in lever 43.

The transfer lever 43 is biased to an outward position by a feedback bellows 50 having one end soldered or otherwise secured within a suitable opening in the base 40. A feedback line 51 connects the lower end of the bellows 50 to the exhaust line 42. The opposite end of the bellows 50 is closed. A cap 52 mates with the closed end of bellows 50 and is interconnected to the outer end of the lever 43 by a threaded attachment screw 53 which is threaded into a tapped opening in the outer end of the lever. The positioning of the attachment screw 53 varies the standby position of the lever 43 and therefore the lid 47 with respect to nozzle orifice end 46.

The feedback bellows 50 is balanced by an electromagnetic means energized from the sensor 5 and mounted adjacent the pedestal 44. The means includes a magnetic core 54 secured to the base 40 in alignment with an armature plate 55 secured to the underside of the lever 43. A signal coil 56 encircles the core 54 and is connected to the sensor 5. The output of the sensor 5 is an electrical signal proportional to the sensed temperature and the signal coil 56 is energized. The magnetic attraction on the transfer lever 43 is correspondingly of a proportionate level and draws the transfer lever 43 down against the force of bellows 50 to seal the lid 47 to the nozzle end 46. The lid 47 is therefore held in a position where the magnetic forces of coil 56 are balanced by the pneumatic force of bellows 50.

In accordance with the present invention, the lid 47 and the nozzle end 46 constitute contact members which are interconnected by contact leads 57 and 58 into the compressor drive circuit. Further, the contacts provided by the lid 47 and the leak port nozzle end 46 are of any suitable variety showing a proportional variation in resistance with a change in the positioning of the leak port lid. For example, the lid and the nozzle end 46 may be formed respectively of carbon and carbon; carbon and a semiconductor, a metal and carbon, or other combinations of such materials such that the resistance characteristic is similar to that shown in FIG. 6. In the illustrated embodiment, the contact resistance is high when the lid 47 moves to the open position and decreases as lid 47 is forced downwardly on the nozzle end 46 and increases the contact pressure.

Figure 4:
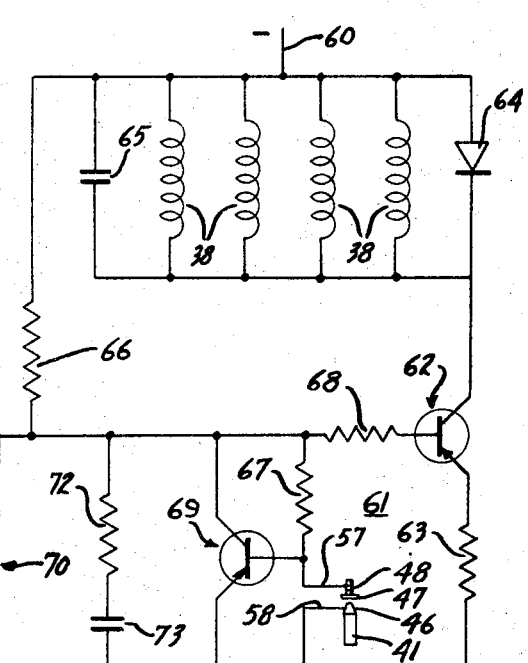
FIG. 4 is a schematic circuit diagram of the energizing control circuit for the electro-pneumatic compressor shown in FIG. 1.

The control of the compressor 3 is preferably constructed in accordance with the schematic circuit in FIG. 4.

Generally, in FIG. 4, the driving coils 38 are connected to suitable direct current (D.C.) power lines 59 and 60 through a negative gain, direct current amplifying circuit 61 which includes the signal coil 39 and the lid 47 and nozzle end 46.

More particularly, the amplifying circuit 61 includes a transistor 62 connected in a common emitter configuration. The transistor 62 is shown as a PNP variety and the other transistors hereinafter described are well known devices and the several elements are not described in detail. An NPN transistor could of course be used.

An emitter resistor 63 interconnects the emitter to the positive line 59 and the collector is connected to the negative line 60 in series with the parallel connected driving coils 38. A protective diode 64 is connected in parallel with the driving coils and is reverse biased by the D.C. power lines 59 and 60. A slowdown capacitor 65 which is more fully described hereinafter is also connected in parallel with the driving coils 38.

The transistor 62 is provided with a bias circuit including a fixed resistor 66 and a resistor 67 in series with each other and with the lid 47 and the nozzle end 46 between the power lines 59 and 60. A base resistor 68 connects the junction of the resistors 66 and 67 to the base of the transistor 62.

Figure 6:
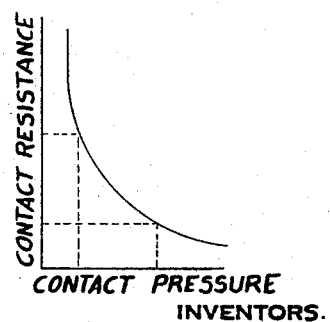
FIG. 6 is a graph of the contact pressure versus resistance of the leak port unit shown in FIG. 1 and connected as a part of the circuit of FIG. 4.

An overriding cutoff control transistor 69 has its emitter to collector circuit connected across the input circuit of the transistor 62 and particualry between the junction of resistors 66 and 67 and the positive power line 59. Its base is connected directly to the junction of the resistor 67 and the contact lid 47 of the servo valve unit. The bias on the transistor 69 is directly controlled by the resistance between lid 47 and nozzle end 46. As previously noted, a typical resistance characteristic may be as shown in FIG. 6 wherein the resistance decreases with increasing contact pressure. If servo valve lid 47 does not tightly engage nozzle end 46, the resistance is high and the voltage drop is sufficient to bias the cutoff transistor 69 to conduct. When transistor 69 conducts, its emitter to collector circuit essentially holds the base and emitter of the transistor 62 at essentially the same voltage and prevents conduction of transistor 62. As the lid 47 is drawn into tight engagement with nozzle end 46, the resistance and corresponding voltage drop decreases to a level at which the cutoff transistor 69 ceases to conduct. At this time the potential at the junction of resistors 66 and 67 rises to a sufficient negative level to bias the transistor 62 to conduct and energize the coils 38 with direct current.

This initiates the operation of the compressor 3 with the initial stroke of the armature 26 and diaphragm plate 29 forcing air from chamber 17 to the operator 2 and to the servo valve unit 4. The magnetic flux also links the coil 37 which terminates the energizing cycle as follows.

A feedback transistor 70 is connected to respond to the output of the compressor signal coil 39 to provide for cyclical energization of the driving coils and reciprocal operation of the armature and the attached diaphragm. The feedback transistor 70 is shown as a PNP transistor having its emitter to collector circuit connected across the input to the transistor 62 in parallel with transistor 69. A protective diode 71 is connected in series with the signal coil 37 between the base and emitter of the transistor 70 such that the voltage generated by the flux established by coils 38 is of a polarity to bias transistor 70 to conduct.

At a selected voltage level of the signal, the transistor 70 is biased to conduct and essentially holds the base of the main transistor 62 at the level of the emitter thereby biasing the transistor off. This de-energizes the driving coils 38 and the armature 26 is biased to the open gap position by the bias springs 30 and 32 to return the compressor to the start position of its stroke.

The change from conduction to nonconduction states as a result of cutoff of the transistor 62 results in a rapidly collapsing magnetic field within the magnetic assembly of the compressor. This generates a relatively high reverse voltage in both the driving coils 38 and the signal coil 39. The diode 71 blocks and protects the transistor 70 from the reverse signal coil voltage and bypasses the energy to provide the transistor 62 and the paralleled capacitor 65 from the driving coil voltage.

The condenser 65 reduces the initial rate of current increase in the driving coil 38. This minimizes the initial voltage developed in the signal coil 39 and positively prevents premature conduction of the transistor 70 with a resulting possible premature cutoff of the driving coils 38.

A delay circuit including a resistor 72 in series with a capacitor 73 is connected in parallel with the emitter to collector circuit of the transistor 70. The capacitor 73 is charged during the period the transistor 62 conducts to energize the coil 38. When the feedback transistor 70 is biased to conduct, the capacitor 73 discharges through the transistor 70. When transistor 62 turns off, a charging current flows through the capacitor 73 and holds transistor 62 nonconducting for the charging time constant. This positively holds the transistor 62 and coils 38 de-energized in a nonconducting state for a sufficiently long period to permit the armature 26 to return to the fully retracted or open gap position. This is of great significance in maintaining full stroke operation of the compressor and therefore a high efficiency.

After the timing period of capacitor 73, and assuming transistor 69 is held off as a result of high contact pressure and thus low resistance of the lid to nozzle engagement, transistor 62 again conducts, energizing coils 38 to establish a second pumping cycle. The cyclical actuation of the compressor increases the output pressure which is simultaneously applied to the operator 2 and to the feedback bellows 50.

As pressure level increases, the transfer lever 43 moves outwardly which reduces the contact pressure and increases the resistance to the level creating an "on" bias voltage across the base to emitter of transistor 69 which conducts and turns off the transistor 62 and therefore compressor 3.

If the signal to the servo valve unit 4 decreases, the pressure of the bellows feedback pressure opens the contacts and exhausts air from the system until a balance is established between the feedback bellows pressure and the magnetic force of the signal.

In summary, the coil 56 of servo valve unit 4 is energized to establish a selective set pressure at the output line 11 and operator 2. With the output pressure below such level, lid 47 is held tightly to nozzle or leak port 41 and the resistance of the nozzle tip 46 is low such that transistor 69 is held off. The driving coils 38 are energized to establish intermittent, full stroke operation of the pump or compressor 3 in accordance with load conditions and subsequently in response to the change in resistance of the nozzle contacts of the servo valve unit 4.

In operation, the rate of displacement or acceleration of the movable member or armature 26 of the magnetic assembly determines the rate of rise of the voltage signal in the coil 39. The acceleration of the movable member and the voltage rate of rise in turn is proportional to the load on the output side of the compressor. The compressor is therefore de-energized earlier in the stroke for a light load than for a heavy load. The assembly of moving parts is selected such that the pumping member or diaphragm completes essentially a full stroke to absorb the kinetic energy in the moving mass and produces the desired output.

As the output pressure increases, the servo valve unit 4 is actuated to increase the opening of the leak port 46 and reduce the contact pressure with a resulting increase in the contact resistance of the nozzle tip 46.

As a result transistor 69 conducts and prevents further conduction through the series circuit of the transistor 62 and coils 38.

When the output pressure drops, the resistance of resistor 46 again decreases to establish the cyclical actuation of the compressor 3 with the energization being dependent on the set output pressure level.

Figure 7:
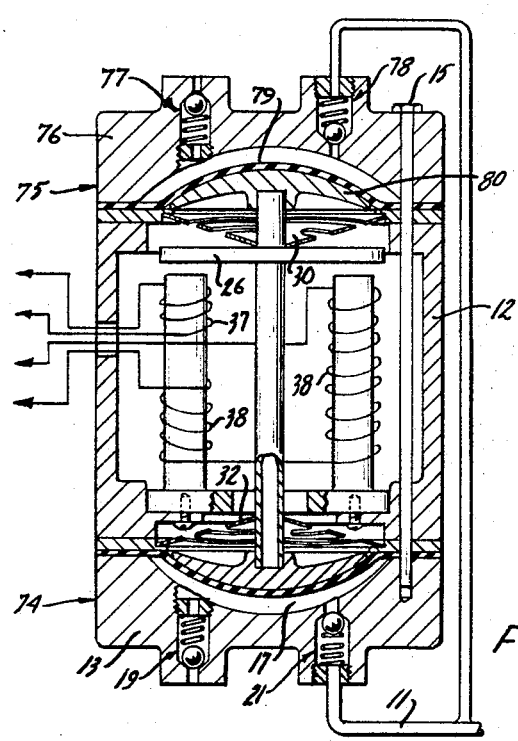
FIG. 7 is an axial cross section of a double acting pump.

In FIG. 7, a double action pump similar to the single action pump of FIG. 1 is shown. In the embodiment of FIG. 7, pump sections 74 and 75 are provided on opposite ends of tube 27. The pump section 74 is the same as that shown in FIG. 1 and pump section 75 is similarly formed in the opposite end of the pump housing 12. The pump section 74 otherwise corresponds to that of FIG. 1 and consequently corresponding elements in the embodiments are similarly numbered and only the structure of the added pump section 75 and its functioning is described in the following description.

In FIG. 7, the second pump section 75 includes a pump head 76 which replaces the end cap 14 shown in FIG. 1. The head 76 is the same as the lower head and includes a similarly valved air inlet 77 and a similarly valved air outlet 78. The head is secured to the housing 12 by the bolts 15 with the periphery of a flexible diaphragm 79 clamped between the head 76 and the housing 12 to define a pump chamber.

The diaphragm 79 is secured to the face of a diaphragm backup plate 80 which is secured to the upper end of the tube 27 such that the reciprocation of tube 27 produces pumping action. The outlet 78 of the second pump section 75 is connected to line 11 to supply air to the operator 2 and to the servo valve unit 4 via line 42.

The tube 27 is lengthened to locate the diaphragm 79 at the end of a pump stroke with the opposite pump section 74 at the beginning of a pump stroke. The pump sections 74 and 75 therefore alternately supply air to the common load line 11 and the feedback line 42.

In operation, the pump coils 38 are energized as previously described an attract the armature 26. The pump section 74 delivers air to line 11 while pump section 75 draws air into its chamber from the surrounding or such other source as may be provided.

During this stroke of tube 27, the bearing springs 31 and 32 are stressed sufficiently so that when the coils 38 are de-energized, the air in the chamber of pump section 75 is compressed and supplied to the load 2 and valve unit 4. The pump otherwise functions in the same manner as the single acting pump of FIG. 1.

The present invention thus provides a new and novel compressor and servo valve unit for actuating a load. The compressor can be made as a relatively compact device without appreciable noise of operation and therefore may be mounted with the operator or operators.

We claim:
1. A pneumatic controller for operating a pneumatic load, comprising
    an electromagnetic compressor having a driving coil means and a magnetic assembly including a movable magnetic member coupled to actuate a pumping member, said compressor having a pneumatic output means adapted to be coupled to the load, said compressor further including a signal coil means continuously coupled to the magnetic assembly and providing a continuously varying amplitude signal in accordance with the acceleration of the assembly, an energizing circuit including said driving coil means and a switch means connected to control energization of the driving coil means, said switch means having input means and being responsive to the amplitude of the signal applied to the input means, and a first control circuit including said signal coil means and connected to the input means and actuating said switch means in response to a preselected amplitude of said continuously varying signal in the signal coil means.

2. The pneumatic controller of claim 1 wherein
the driving coil means includes a plurality of spaced coils wound on individual core portions of said magnetic assembly an includes an armature overlying said core portions and said signal coil means is wound on at least one of said core portions.

3. The pneumatic controller of claim 2 wherein the armature is a plate-like member secured to a central shaft extending coaxially of said driving coils, and having flat disc-like springs having an outer fixed peripheral portion and a central portion secured to the shaft to urge the shaft to an initial position and to support the shaft for axial movement.

4. The pneumatic controller of claim 3 wherein said pump member is a diaphragm forming one side of a pump chamber means located to one end of said coil means, said pump chamber means having a valved inlet means and having a valved outlet means.

5. The pneumatic controller of claim 4 including a second pump chamber located to the opposite end of the coil means and having a diaphragm secured to the opposite end of the shaft.

6. The pneumatic controller of claim 1 wherein
the coil means of the electromagnetic compressor includes a plurality of circumferentially distributed driving coils wound on individual cores, the magnetic assembly includes an armature overlying the ends of the cores, said armature being connected to a shaft of the pumping member, spring means urge the armature to a position spaced from the coils, and said signal coil means being wound on one of said cores and providing a continuously varying output signal in accordance with the acceleration of the armature.

7. The pneumatic controller of claim 1 including a servo valve connected to the output line and having a resistor means having a pressure controlled resistance value to establish a resistance proportional to the output pressure, said switch means being a transistor connected in series with the driving coil means, said transistor having an input bias circuit means including said resistor means connected to produce an "on" bias in response to a selected resistance and an "off" bias in response to a selected different resistance, said first control circuit including a control transistor connected to bypass said input bias circuit means and having said signal coil means connected to bias the control transistor to conduct in response to a preselected amplitude of the signal in the signal coil means.

8. The pneumatic controller of claim 7 wherein said input bias circuit means includes a second control transistor connected to bypass an input signal from the first transistor and the second control transistor includes an input circuit including said resistor means.

9. The pneumatic controller of claim 1 including
a servo valve unit having a control signal input means and having a feedback means connected to the output line and establishing a blaance between the output of the compressor and the control signal, electrical control means actuated by the servo valve unit in accordance with a preselected balance condition, and
a second control circuit including said control means and connected to actuate said switch means to selectively prevent energization of the compressor, 10. The pneumatic controller of claim 9 wherein said servo value unit includes a movable balance member and a resistor means mounted in the path of the balance member and establishing a resistance proportional to the force of the balance member exerted on said resistor, and said second control circuit includes said resistor means connected to actuate said switch means in response to a selected resistance of the resistor means to prevent energization of the compressor.

11. The pneumatic controller of claim 9 wherein said servo valve unit includes, a movable member and a fixed member, said signal input means is an electromagnetic means connected to move the movable member in a first direction with respect to the fixed member, a feedback pressure member connected to move the movable member in the opposite direction with respect to the fixed member, said electrical control means is a resistance means having a resistance proportional to the stress thereof, and means to mount the resistance means in the path of the movable member to stress the resistance means in accordance with the relative forces established by the electromagnetic means and the feedback pressure member.

12. The pneumatic controller of claim 11 wherein said fixed member is a leak port connected to the output line and the terminal end of the leak port constitutes said resistance means and said movable member is a leak port lid positioned over said leak port.

13. The pneumatic controller of claim 9 wherein
the electromagnetic compressor includes a plurality of circumferentially distributed driving coils and the magnetic assembly including a plurality of cores, one for each coil and an armature overlying the ends of the cores, said armature being coupled to actuate a pumping member, spring means urging the armature to a position spaced from the coils, said signal coil means being wound on one of said cores and providing a continuously varying output signal in accordance with the acceleration of the armature, said servo valve unit including a pivotally supported transfer member and oppositely positioned by said control signal input means and the feedback means, a leak port unit connected to the output line and to the transfer member, at least one of said engageable members being a resistor means having a pressure controlled resistance value to establish a resistance proportional to the output pressure, said energizing circuit including said coils connected in parallel with each other and in series with a transistor for controlling energization of the coils, said transistor having an input bias circuit means including said resistor means biasing said transistor to conduct, said first control circuit including a transistor connected to bypass the input circuit and including said signal coil means connected to bias the first control transistor to conduct in response to a preselected amplitude of the signal in the signal coil means, and a second control circuit including a transistor connected to bypass the input circuit of the control transistor and the second control transistor having an input circuit including said resistor means and connected to bypass the input circuit of the main transistor in response to a selected resistance of the resistor means to prevent energization of the compressor.

14. The pneumatic controller of claim 13 having a timing means connected in parallel with the input circuit of the main transistor to hold the main transistor off for a selected time after said second control transistor is biased off.

15. The pneumatic controller of claim 1 including a servo valve unit for establishing an electrical control signal, comprising a movable member and a fixed member, an electromagnetic means connected to move the member in a first direction with respect to the fixed member, a feedback pressure member connected to move the member in a second opposite direction different with respect to the fixed member, a resistance means having a resistance proportional to the stress thereof, and means to mount the resistance means in the path of the movable member to stress the resistance means in accordance with the relative force of the electromagnetic means and the feedback pressure member.

References Cited

UNITED STATES PATENTS

| | | | |
|---|---|---|---|
| 1,534,829 | 4/1925 | Behmke | 103—53 |
| 2,194,535 | 3/1940 | Von Delden | 230—55 |
| 2,686,280 | 8/1954 | Strong et al. | 230—55 X |
| 3,050,257 | 8/1962 | Sweger et al. | 236—84 X |
| 3,087,471 | 4/1963 | Ray | 236—84 X |
| 3,118,383 | 1/1964 | Woodward | 103—53 |
| 3,200,591 | 8/1965 | Ray | 103—53 |
| 3,221,798 | 12/1965 | Kofink | 103—53 X |

WILLIAM L. FREEH, *Primary Examiner.*